Patented June 20, 1944

2,352,046

UNITED STATES PATENT OFFICE 2,352,046

METHOD OF PRODUCING BAKER'S WARE BY MEANS OF THE FERMENTATION OF YEAST DOUGH

Friedrich von Viditz, Vienna, Germany; vested in the Alien Property Custodian

No Drawing. Application April 22, 1941,
Serial No. 389,746

7 Claims. (Cl. 99—90)

This invention relates to the production of baker's ware, more particularly small bread or wheat flour and flours blended from wheat flour and rye flour, by means of the fermentation of yeast dough. The process provided by the invention may also be applied to the production of what is termed yeast bread where either rye flour or mixed rye flour is worked with yeast instead of leaven.

It is known in the production of baker's ware by means of the fermentation of yeast dough to use either diastatic malt flours or malt extracts as baking means which create satisfactory conditions for the activity of the yeast especially through their amylolytic ferments. Baking means of this kind are to secure a considerable increase in the baking volume, a uniform and finely porous shape and adequate browning and hard baking of the bread.

The present invention resides in the new knowledge that buckwheat (particularly the seed of the plants Polygonum fagorypum and polygonum tartaricum) contains, even in unmalted condition, substances—and principally watersoluble substances—capable of greatly stimulating the activity of the yeast in the fermentation of the yeast dough, this being the more astonishing since these substances possess but a slight diastatic activity or none at all. Therefore the object of the invention is a method of producing baker's ware by means of the fermentation of yeast dough, the essential feature of said method being the circumstance that buckwheat, preferably extracts of buckwheat, at best in a concentrated form or in the form of a dry preparation, are incorporated either in the preparation of dough or in the dough, depending on the type of baking method adopted, and afterwards the dough is subjected to the fermentation and baking process. When buckwheat after separating the husks is ground to customary fineness and added to the dough in amounts of, say 3–10% relative to the weight of dough, a sensible acceleration of the leavening effect will be observed. The not particularly known agent stimulating the leavening effect is contained to an appreciable extent in the aqueous extracts of buckwheat flour; if such extracts are evaporated to dryness, a product greatly stimulating the leavening effect will be obtained. By using or adding these substances obtained from buckwheat and stimulating the activity of yeast, not only similar results as regards the desired properties of the baker's ware will be obtained, as when using the diastatic baking means, but in addition the specific advantage of considerably reducing the time of fermentation and ripeness of the dough will be afforded. This is, above all, due to the intense starting of the activity of yeast at the beginning of the fermentation and to the increased leavening effect at the moment. Such a reduction in working time is much desirable in view of the general tendency to limit the working time in bakeries and also in some territories because of the legal control of working hours, e. g., appointment of the time of commencement of work, prohibition of baking at night, etc.

To obtain suitable means adapted to carry into effect the method according to the invention, it may be proceeded in different ways:

To produce an extract of buckwheat answering the purpose of the invention it suffices already to mix the crushed seed, suitably in the form of grist, bran or flour, with water (for instance, in the ratio of 2.5 kgs. of buckwheat to 10 liters of water), leave it for awhile by stirring now and then, and clarify. A solution containing approximately 1.5 to 2 per cent. by weight of dry substance will be obtained. The obtained extract may be concentrated carefully, preferably in vacuum, at a low temperature and, if necessary, evaporated to dryness. Furthermore, the extracts either, as they are, or after a preceding concentration accomplished by the addition of absorbents, such as, e. g., flours, particularly finely comminuted flours, may be converted into a powdery dry preparation.

It has proved particularly satisfactory to combine the extracts obtained from buckwheat with baking additions or baking means which complete the action of the substances originating from the buckwheat and stimulating the yeast in that the latter is at the same time offered fermentable sugar. Such supplemental means are, e. g., invert sugar solutions, such as glucose solutions, for instance, potato or starch sirups, further maltose sirup and the conventional diastatic baking extracts, e. g., malt extracts, which are rich in maltose and, in addition, produce fermentable sugar in the course of fermentation by enzymatic decomposition.

Although the combined products, when using invert sugar or glucose solution or maltose sirup, show hardly any diastatic activity, yet an intense leavening effect, especially at the beginning of the fermentation of dough, will be obtained. By combining the agents of the buckwheat with diastatically acting malt extracts or the like, the fermentation of dough will start quickly and intensely and the advantageous influence on the fermentation and maturity will be prolonged; in this respect it has been found that the agents derived from the buckwheat promote also the action of the diastatic products. It is understood that both measures may also be combined by using invert sugar or maltose, and the like as well as malt preparations beside the active substances of buckwheat for the fermentation of dough.

According to one embodiment of invention, with a view to obtaining practically non-diastatic baking means being effective in accordance with the invention, glucose or potato sirup may be added to an extract of buckwheat, e. g., in the ratio 1:1 calculated for dry substance, and afterwards the mixture may be evaporated at a moderate temperature to give the desired consistency. The sirup may also be added to a finished concentration. A faintly diastatic baking means may also be obtained by combining a buckwheat extract with buckwheat malt or extracts thereof, the mixture—at best together with potato sirup or glucose—being allowed to be further worked into concentration or dry products.

A baking means uniting the stimulants of the buckwheat with diastatically acting substances may be obtained either by adding extracts of malt, such as barley malt, or wheat malt, to the buckwheat extracts and evaporating the combined extracts at a moderate temperature or by decomposing starchy raw materials (e. g., rice, maize) by means of malt and adding the mash or wort to a buckwheat extract and subsequently working it into a concentration or dry preparation.

According to a preferred embodiment of the invention, such an agent is prepared by mashing common buckwheat grist and malt from grain, especially barley malt, and working it into a cold extract containing the extractives of both the buckwheat and malt. The residue of the extraction may at best be decomposed by using further quantities of malt; this may be done in the manner usual in the manufacture of malt extract or in working buckwheat for the production of spirits. By choosing the amounts of buckwheat grist and barley malt in the proportion of 4 parts of buckwheat grist to 1 part of barley malt, a baking means that gave excellent results in the baking test has been obtained.

According to another method of operation, buckwheat grist is extracted with water whereupon the residue is decomposed by the action of products rich in enzyme, such as, e. g., barley malt, and the thus obtained wort is evaporated in common with the first obtained cold extract at moderate temperatures to the corresponding consistency.

To produce the mashes commercially, use is made in all of these cases of the mashing processes customary in the mal extract industries, preferably the step-mashing process or the congress mash, the greatest possible decomposition being obtained by stages of temperature, say at 45° and 60° C.

In general, the method provided by the invention proceeds from ungerminated buckwheat suitably extracted in crushed shape as grist, bran or flour. This affords the advantage that losses due to malting shrinkage will be obviated. However, extracts of buckwheat flour or mashed extracts of ungerminated buckwheat and buckwheat malt which—in contrast with the extracts from barley malt or wheat malt used in bakeries—have but a very slight diastatic effect, may also be used for the method disclosed by the invention.

The residues remaining after preparing the extracts from buckwheat may be used as initial products for the preparation of nutrients, puff flours, and the like.

The following examples relate to baking tests made in accordance with the so-called "Vienna process" because this method is particularly suitable for the description and numerical data of the reduction in time. It is understood, however, that the invention is not limited to the "Vienna process" but may be applied to any other baking method as well.

The flours used for the baking tests have been of the 630 type (wheat flour with an addition of 10 per cent. rye flour) and in some cases of the 600 type. The quantitative preparations with the "sponge"—known by those skilled in the art to be a preliminary dough or preparation of dough containing the whole leavening agent, the greater part of the fluid, and only a fraction, e. g., one third, of the flour—500–600 grams of flour, 500 cu. cm. of water, 50 grams of pressed yeast; when mixing the dough: 1100 to 1300 grams of flour, 500 cu. cm. of water, and 30 grams of salt.

The baking means to be tested was added to the "sponge" at a rate of 20 grams when mixing. Breads in molds were made, for each test 6 items which were baked simultaneously with the respective checking specimen or another comparison specimen.

*Example 1*

250 grams of buckwheat grist were soaked with 1000 cu. cm. of water and left overnight at room temperature. When clarifying, a first filtrate of 1.6 deg. Balling weighing 455 grams (dry substance 7.3 grams), when rinsing out with water, a second filtrate of 1.2 deg. Balling weighing 950 grams (dry substance 5.7 grams) was obtained. The combined filtrates were evaporated in vacuum at a moderate temperature (maximum temperature 55° C.) to dryness, resulting in a mass which on being pulverized crumbles and forms a yellow powder.

When adding to the sponge 20 grams of the baking means obtained in the manner above referred to, the baking test gave a baking volume of 1163 cu. cm. Compared with the checking specimen an increase in baking volume of 68 cu. cm. (equal to 6.2%) was ascertained. The sponge time was 36 minutes, the reduction in sponge time was 16 minutes (31%) compared with the checking specimen.

*Example 2*

An extract from buckwheat grist made in accordance with Example 1 was mixed with such an amount of potato sirup that the ratio of the dry substance was 1:1. The mixture was evaporated in vacuum at a moderate temperature. When using this baking means for the test, a baking volume of 1140 cu. cm. was obtained. The increase in baking volume over the checking specimen was 45 cu. cm. (equal to 4%). The "sponge" time was 40 minutes, the reduction in "sponge" time was 10 minutes (equal to 19%) compared with the checking specimen.

*Example 3*

4 parts by weight of buckwheat grist were mixed with 0.08 parts by weight of highly diastatic barley malt and a cold extract was made from the mixture. The duration of action was approximately 10 hours at room temperature. After clarifying, the residue was pasted up while adding water at 75° to 80° C. After cooling down to about 50° C., additional 0.92 parts of a highly diastatic barley malt were added and mashed for one hour at 60° to 70° C. After renewed clarifying, the wort was evaporated together with the cold extract in vacuum to give a consistency of extract at about 80 deg. Balling.

The baking test made by the aid of this baking means resulted in an increase in baking volume of 6% compared with the checking specimen. The reduction in "sponge" time was 22% over the checking specimen.

*Example 4*

One part by weight of buckwheat grist was mixed with one part by weight of barley malt, mashed and, after 10 hours of standing, a cold extract was prepared. The residue was mashed in the manner customary in the production of diastatic malt extracts for baking purposes. The clarified wort was evaporated in vacuum together with the cold extract. The action of this baking means was compared with a commercial, highly diastatic baking means in the baking test. The increase in baking volume was 5% compared with the diastatic baking means. The baker's ware obtained was of striking appearance. Compared with the checking specimen, the increase in baking volume was 10.4%, the reduction in "sponge" time 33%.

*Example 5*

The same procedure as in Example 4 was adopted, but in 4 parts by weight of buckwheat grist there was 1 part by weight of highly diastatic barley malt. The increase in baking volume was 14% compared with the checking specimen. The reduction in "sponge" time was 37% over the checking specimen.

*Example 6*

Buckwheat flour was mashed with water. After 10 hours standing it was filtered off. The cold extract was mixed with such an amount of malt extract that the ratio of the dry substance was 1:1. The mixture was evaporated in vacuum.

The increase in baking volume was 6% over the checking specimen. The reduction in "sponge" time was 21% over the checking specimen.

I claim:

1. The method of producing baker's ware which consists in adding to a conventional yeast and wheat flour dough an amount of an aqueous extract of buckwheat equivalent to 3 to 10% of dry buckwheat flour.

2. The method of producing baker's ware which consists in adding to a conventional yeast and wheat flour dough an amount of a dry extract of buckwheat obtained by evaporating an aqueous extract thereof to dryness and equivalent to 3 to 10% of dry buckwheat flour.

3. The method of producing baker's ware which consists in adding to a conventional yeast and wheat flour dough of an aqueous extract of buckwheat combined with fermentable sugar said buckwheat extract being equivalent to 3 to 10% of dry buckwheat flour.

4. The method of producing baker's ware which consists in adding to a conventional yeast and wheat flour dough of an extract of buckwheat combined with invert sugar said buckwheat extract being equivalent to 3 to 10% of dry buckwheat flour.

5. The method of producing baker's ware which consists in adding to a conventional yeast and wheat flour dough of an extract of buckwheat combined with maltose said buckwheat extract being equivalent to 3 to 10% of dry buckwheat flour.

6. The method of producing baker's ware which consists in adding to a conventional yeast and wheat flour dough of an extract of buckwheat combined with glucose said buckwheat extract being equivalent to 3 to 10% of dry buckwheat flour.

7. The method of producing baker's ware which consists in adding to a conventional yeast and wheat flour dough of an extract of buckwheat combined with malt extract said buckwheat extract being equivalent to 3 to 10% of dry buckwheat flour.

FRIEDRICH von VIDITZ.

CERTIFICATE OF CORRECTION.

Patent No. 2,352,046.                                                  June 20, 1944.

FRIEDRICH von VIDITZ.

It is hereby certified that error appears in the printed specification of the above numbered patent requiring correction as follows: Page 1, first column, line 2, for "bread or" read --bread of--; page 2, first column, line 61, for "mal" read --malt--; and that the said Letters Patent should be read with this correction therein that the same may conform to the record of the case in the Patent Office.

Signed and sealed this 24th day of October, A. D. 1944.

Leslie Frazer

(Seal)                                      Acting Commissioner of Patents.